United States Patent
Marrs et al.

(10) Patent No.: US 10,082,123 B2
(45) Date of Patent: Sep. 25, 2018

(54) ELECTRONIC SPARK TIMING CONTROL SYSTEM FOR AN AC IGNITION SYSTEM

(71) Applicant: MARSHALL ELECTRIC CORP., Rochester, IN (US)

(72) Inventors: Thomas C. Marrs, Rochester, IN (US); Stephen P. Barlow, Carmel, IN (US)

(73) Assignee: MARSHALL ELECTRIC CORP., Rochester, IN (US)

( * ) Notice: Subject to any disclaimer, the term of this patent is extended or adjusted under 35 U.S.C. 154(b) by 11 days.

(21) Appl. No.: 15/419,403

(22) Filed: Jan. 30, 2017

(65) Prior Publication Data

US 2018/0216596 A1    Aug. 2, 2018

(51) Int. Cl.
F02P 3/00    (2006.01)
F02P 3/08    (2006.01)
F02P 5/15    (2006.01)

(52) U.S. Cl.
CPC ............... *F02P 3/0876* (2013.01); *F02P 5/15* (2013.01)

(58) Field of Classification Search
CPC .................................................... F02P 3/0876
See application file for complete search history.

(56) References Cited

U.S. PATENT DOCUMENTS

| 4,446,842 | A | * | 5/1984 | Iwasaki | F02P 3/01 123/169 PA |
|---|---|---|---|---|---|
| 4,977,883 | A | * | 12/1990 | Koiwa | F02P 3/051 123/609 |
| 4,996,967 | A | * | 3/1991 | Rosswurm | F02P 9/007 123/598 |
| 4,998,526 | A | * | 3/1991 | Gokhale | F02P 3/005 123/598 |
| 5,020,506 | A | * | 6/1991 | Ozawa | F02P 1/086 123/631 |
| 5,056,496 | A | * | 10/1991 | Morino | F02P 3/0884 123/604 |
| 5,060,623 | A | * | 10/1991 | McCoy | F02P 3/0884 123/605 |
| 5,806,504 | A | | 9/1998 | French et al. | |
| 6,112,730 | A | * | 9/2000 | Marrs | F02P 23/04 123/606 |
| 6,135,099 | A | * | 10/2000 | Marrs | F02P 3/0884 123/606 |
| 6,670,777 | B1 | * | 12/2003 | Petruska | F02P 3/0876 123/598 |
| 8,931,457 | B2 | * | 1/2015 | Petruska | F02P 15/02 123/406.12 |
| 9,709,017 | B2 | * | 7/2017 | Hashimoto | F02P 9/007 |

(Continued)

*Primary Examiner* — Hieu T Vo
*Assistant Examiner* — Sherman Manley
(74) *Attorney, Agent, or Firm* — Egbert Law Offices, PLLC

(57) ABSTRACT

A method of firing a spark plug of an internal combustion engine includes supplying AC power to the spark plug in which the AC power has a waveform with a rising edge and a falling edge, activating the spark plug during the rising edge of the waveform, and deactivating the spark plug during the falling edge of the waveform. This method further includes connecting an engine control module to an ignition coil and connecting the engine coil to the spark plug. The firing of the ignition coil mirrors the square waveform of AC power from the engine control module. A battery is connected to the engine control module.

7 Claims, 3 Drawing Sheets

(56) References Cited

U.S. PATENT DOCUMENTS

| | | | |
|---|---|---|---|
| 9,771,918 B2 * | 9/2017 | Nakayama | F02P 9/002 |
| 9,784,232 B1 * | 10/2017 | Marrs | F02P 9/002 |
| 2016/0047352 A1 * | 2/2016 | Nakayama | F02P 3/0453 |
| | | | 123/406.19 |

* cited by examiner

ELECTRONIC SPARK TIMING CONTROL SYSTEM FOR AN AC IGNITION SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to internal combustion engines. More particularly, the present invention the relates to electrical ignition systems that are used for the igniting of fuel within the internal combustion chamber. More particularly, the present invention the relates to the electronic spark timing control of an AC ignition coil which applies an AC voltage for the ignition of the spark plug within the internal combustion engine.

2. Description of Related Art Including Information Disclosed Under 37 CFR 1.97 and 37 CFR 1.98.

Most internal combustion engines have some type of an ignition circuit to generate a spark in the cylinder. The spark causes combustion of the fuel in the cylinder to drive the piston and the attached crankshaft. Typically, the engine includes a plurality of permanent magnets mounted on the flywheel of the engine and a charge coil mounted on the engine housing in the vicinity of the flywheel. As the flywheel rotates, the magnets pass the charge coil. A voltage is thereby generated on the charge coil and this voltage is used to charge a high-voltage capacitor. The high-voltage charge on the capacitor is released to the ignition coil by way of a triggering circuit so as to cause a high-voltage, short-duration electrical spark across the gap of the spark plug and ignite the fuel in the cylinder. This type of ignition is called a capacitive discharge ignition.

Typically, the engine control module provides an electronic spark timing pulse which is used to command a given spark event for a given engine cylinder. This electronic spark timing pulse is commanded for a given amount of time to charge the primary coil to the desired current or energy. The electronic spark timing pulse duration is often referred to as "dwell-time" or charging time for a given coil and engine operating condition. As an example, during cold starting conditions, when the engine is cold, and the battery voltage is low, the electronic spark timing control signal for a given cylinder may have an extended pulse duration to fully charge the coil to generate the necessary energy in the primary coil. This energy is then transferred to the secondary coil that is connected to the spark plug output. Likewise, during hot engine conditions, and nominal battery power, the electronic spark timing pulse can be commanded to have a shorter duration to fully charge the primary coil to a given energy level. Thus, a given electronic spark timing pulse for commanding a given coil operation will vary the dwell time, or charging time, depending on several engine sensor inputs and desired engine operating conditions. Typically, current ignition systems use the electronic spark timing pulse to command a semiconductor power switch device which is connected to the primary coil and allows the coil to reach a targeted primary current. When the semiconductor power device is switched off, the stored energy in the primary coil is then transferred to the secondary coil. Based on the clamping voltage of the power semiconductor switch, and the turns ratio of the secondary to primary windings, an available voltage of approximately 40,000 volts can be provided to the spark plug output. Therefore, the high-voltage spark event is commanded by the falling edge of an electronic spark timing pulse. This translates to a command "turn-off" of the semiconductor power device and energy is then transferred to the spark plug with an exponential voltage decay. Typically, one spark event occurs for each electronic spark timing cycle for a given engine cylinder. This method of control has been employed by numerous engine control module designs used to command DC ignition systems for many years and has become the general method of firing a given spark plug used in an internal combustion engine.

The design of standard reciprocating internal combustion engines which use spark plugs and induction coils to initiate combustion have, for years, utilized combustion chamber shapes and spark plug placements which are heavily influenced by the need to reliably initiate combustion using a single short-duration spark of relatively low intensity that is timed to fire off of the falling edge of the given electronic spark timing pulse.

In recent years, however, increased emphasis has been placed on fuel efficiency, completeness of combustion, exhaust cleanliness, and reduced variability in cycle-to-cycle combustion. This emphasis is meant that the shape of the combustion chamber must be modified and the ratio of the fuel-air mixture changed. In some cases, a procedure has been used which deliberately introduces strong turbulence or a rotary flow to the fuel-air mixture at the area where the spark plug electrodes are placed. This often causes an interruption or blowing out of the arc. This places increasing demands on the effectiveness of the combustion initiation process.

In the past, various patents have issued with respect to such ignition systems. For example, U.S. Pat. No. 5,806,504, issued on Sep. 15, 1998 to French et al., teaches an ignition circuit for an internal combustion engine in which the ignition circuit includes a transformer having a secondary winding for generating a spark and having first and second primary windings. A capacitor is connected to the first primary winding to provide a high-energy capacitive discharge voltage to the transformer. A voltage regulator is connected to the secondary primary winding for generating an alternating current voltage. A control circuit is connected to the capacitor and to the voltage generator for providing control signals to discharge the high-energy capacitive discharge voltage to the first primary winding and for providing control signals to the voltage generator so as to generate an alternating current and voltage.

U.S. Pat. No. 4,998,526, issued on Mar. 12, 1991 to K. P. Gokhae, teaches an alternating current ignition system. The system applies alternating current to the electrodes of a spark plug to maintain an arc at the electrodes for a desired period of time. The amplitude of the arc current can be varied. The alternating current is developed by a DC-to-AC inverter that includes a transformer that has a center-primary and a secondary that is connected to the spark plug. An arc is initiated at the spark plug by discharging a capacitor to one of the winding portions at the center-primary. Alternatively, the energy stored in an inductor may be supplied to a primary winding portion to initiate an arc. The ignition system is powered by a controlled current source that receives input power from a source of direct voltage, such as a battery on the motor vehicle.

In each of these prior art patents, the devices used dual mechanisms in which high-energy discharges were supplemented with a low-energy extending mechanism. The method of extending the arc, however, presents problems to the end-user. First, the mechanism is, by nature, electronically complex in that multiple control mechanisms must be present either in the form of two separate arc mechanisms. Secondly, no method is presented for automatically sustaining the arc under a condition of repeated interruptions. Additionally, these mechanisms do not necessarily provide for a single functional-block unit of low mass and small size which contains all of the necessary functions within.

U.S. Pat. No. 6,135,099, issued on Oct. 24, 2000 to T. Marrs, discloses an ignition system for an internal combustion engine that comprises a transformer means having a primary winding adapted to be connected to a power supply and having a secondary winding adapted be connected to a spark plug. The transformer serves to produce an output from the secondary winding having a frequency of between 1 kHz and 100 kHz and a voltage of at least 20 kV. A controller is connected to the transformer so as to activate and deactivate the output of the transformer means relative to the combustion cycle. The transformer serves to produce the output having an alternating current with a high-voltage sine wave reaching at least 20 kV. A voltage regulator is connected to the power supply into the transformer so as to provide a constant DC voltage input to the transformer. The transformer produces power of constant wattage from the output of the secondary winding during the activation by the controller. The controller is connected to the transformer so as to allow the transformer to produce an arc of controllable duration across the electrode of the spark plug. This duration can be between 0.25 milliseconds and 4 milliseconds. A battery is connected the primary winding of the transformer. The battery produces a variable voltage of between 5 and 15 volts.

It is an object of the present invention to provide electronic spark timing control system that produces a spark arc of a controllable duration.

It is another object of the present invention to provide an electronic spark timing control system that allows various spark arc patterns across the electrode of the spark plug.

It is another object of the present invention to provide electronic spark timing control system that promotes fuel efficiency.

It is another object of the present invention to provide electronic spark timing control system which provides complete combustion and exhaust cleanliness.

It is another object of the present invention to provide electronic spark timing control system that reduces variability in cycle-to-cycle combustion.

It is still another object of the present invention to provide an electronic spark timing control system that provides the ability to pulse the spark arc.

It is still another object of the present invention to provide electronic spark timing control system that allows for a very small ignition coil to be used.

These and other objects and advantages of the present invention will become apparent from a reading of the attached specification and appended claims.

BRIEF SUMMARY OF THE INVENTION

The present invention is a spark ignition system that comprises a spark plug, an AC ignition coil connected to the spark plug so as to apply an AC voltage to the spark plug, and an engine control module connected to the ignition coil so as to provide an electronic spark timing pulse to the ignition coil. The AC voltage has a wave pattern with a rising edge and a falling edge. The engine control module transmits a signal to the ignition coil so as to activate the spark plug between the rising edge and the falling edge of the waveform.

In the spark ignition system of the present invention, a battery is connected to the engine control module. The battery produces at least eight volts. A capacitor is connected to an output of the battery and the engine control module. The capacitor stores and discharges at least 20 volts. A first field-effect transistor and a second field-effect transistor are cooperative with the capacitor and connected to the spark plug so as to transmit energy alternately to the spark plug.

The waveform has a high of five volts and a low of zero volts. The rising edge is from zero volts to five volts. The falling edge is from five volts to zero volts. The signal is between 30 milliseconds and 100 microseconds in length. The ignition coil activates the spark plug in correspondence with the signal from the engine control module. A booster circuit is cooperative with the engine coil so as to collect and store energy from the battery while the ignition coil activates the spark plug. Additionally, the system of the present invention includes an internal combustion engine. The spark plug is cooperative with the internal combustion engine so as to fire fuel in a cylinder of the internal combustion engine when the spark plug is activated. The ignition coil is mounted directly on the spark plug.

The present invention is also a method of firing a spark plug of an internal combustion engine. This method includes the steps of: (1) supplying AC power to the spark plug in which the AC power has a waveform with the rising edge and a falling edge; (2) activating the spark plug during the rising edge of the waveform; and (3) deactivating the spark plug during the falling edge of the waveform.

The method of the present invention also includes connecting an engine control module to an ignition coil and connecting the ignition coil to the spark plug. The AC power is transmitted to the ignition coil. The ignition coil fires continuously between the rising edge and the falling edge of the waveform. The firing of the ignition coil mirrors the waveform of AC power from the electronic control module. A battery is connected to the electronic control module. This battery has at least 28 volts. The DC input power from the battery is converted into an AC output waveform. The energy stored from the capacitor is used during the steps of activating and deactivating. The control waveform is between zero and five volts, typically. The step of deactivating is between 250 microseconds and 10 milliseconds following the step of activating.

The present invention generates a continuous AC high-voltage spark output waveform. The spark event is of a predetermined spark duration based on engine conditions required to provide adequate energy to ignite the combustion mixture for a given cylinder condition. The present ignition system can be commanded to provide a given AC spark event of a predetermined duration based upon the AC system design elements. The AC ignition system can be configured to be directly controlled to start on the rising edge of the electronic spark timing pulse and commanded off during the falling edge of the electronic spark timing signal itself. In this way, various electronic spark timing pulse-width commands can be employed to control the arc duration of the spark plug directly.

The electronic spark timing control method of the present invention provides for the ability to precisely control the spark timing and spark duration. With this control method, spark arc duration can be composed of a series of short or long pulses, or a series of multi-strikes, or a series of multi-bursts, as desired. These types of electronic spark timing pulses with the use of an AC ignition system can be deployed instantaneously without the need for excessive delay due to the dwell/charging times required by standard DC ignition systems used today.

The AC ignition system control method for an internal combustion engine of the present invention includes an engine control module or a power-train control module, or a transmission control module, or similar engine control module. The engine control module has one or more electronic spark timing pulses, each of a duration from 250 microseconds to as much as 10 milliseconds for producing timing control signals to the AC ignition system so as to activate the spark output during the rising edge and to deactivate the output during the falling edge of the electronic spark timing input.

This foregoing Section is intended to describe, with particularity, the preferred embodiment of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
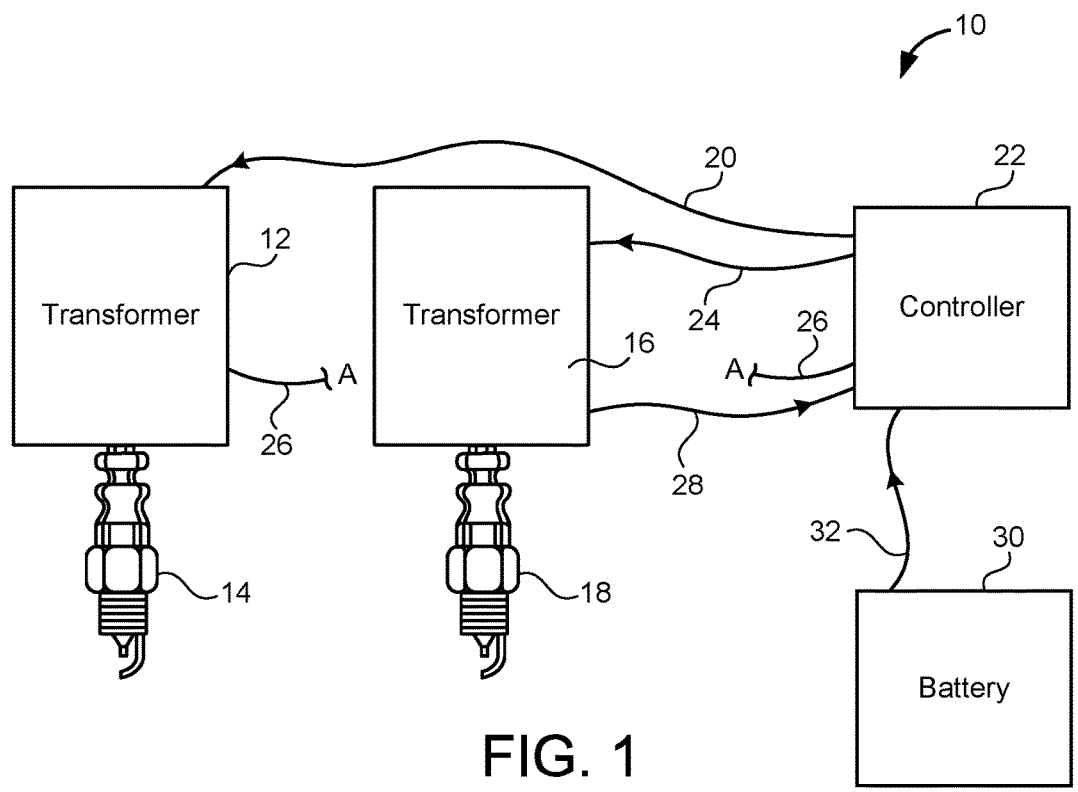
FIG. 1 is a diagrammatic view of the electronic timing control system of the present invention.

Referring to FIG. 1, there is shown the electronic spark timing control system 10 of the present invention. In particular, in FIG. 1, there is a transformer 12 that is directly connected to spark plug 14. Similarly, a transformer 16 is directly connected to the spark plug 18. An electrical line 20 will extend from the engine control module 22 to the transformer 12. Another electrical line 24 will extend from the engine control module 22 to the transformer 16. As such, the engine control module 22 can provide the necessary timing signals to the transformers 12 and 16 for the firing the spark plugs 14 and 18, respectively. Each of the transformers 12 and 16 can be an ignition coil.

The transformer 12 can include a sensor line 26 extending back to the engine control module 22. As such, the engine control module 22 can receive suitable signals from the transformers 12 and 16 as to the operating conditions of the spark plugs 14 and 18 for a proper monitoring of the output current and output voltage of the secondary winding. By providing this information, the engine control module 22 can be suitably programmed optimize the firing of the spark plugs 14 and 18 in relation to items such as engine temperature and fuel consumption. The transformer 16 also includes a sensor line 28 extending back to the engine control module 22. An automotive battery 30 is connected by a line 32 so as to provide power to the engine control module 22. The battery 30 is configured so as to supply at least eight volts to the engine control module 22.

As can be seen in FIG. 1, unlike conventional ignition coils, the firing of each of the spark plugs 12 and 16 is carried out directly on the spark plugs. The engine control module 22 can be a microprocessor which is programmed with the necessary information for the optimization of the firing of each of the spark plugs. The engine control module 22 can receive inputs from the crankshaft or from the engine as to the specific time at which the firing of the combustion chamber of each of the spark plugs 14 and 18 is necessary. Since each of the transformers 12 and 16 are located directly on the spark plugs 14 and 18, respectively, and since they operate at low frequencies, radio interference within the automobile is effectively avoided. Suitable shielding can be applied to each of the transformers 12 and 16 to further guard against any radio frequency interference.

Figure 2:
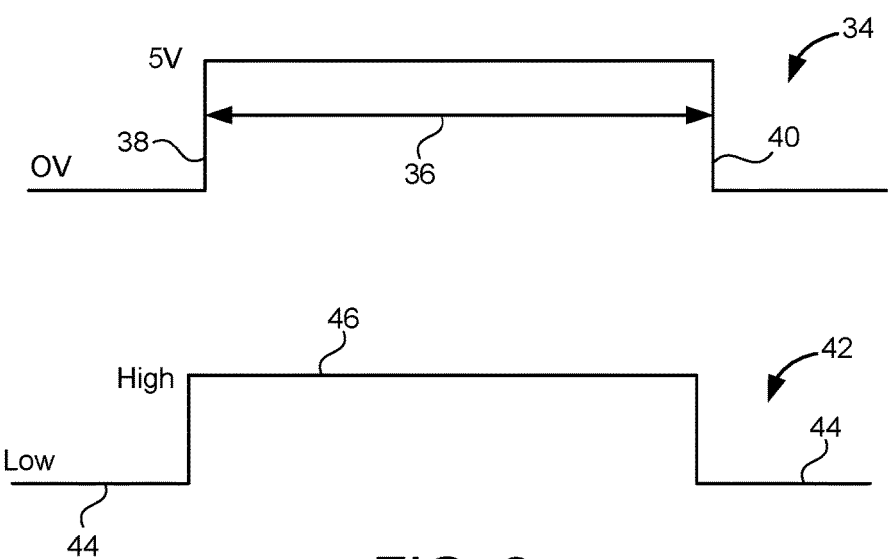
FIG. 2 shows a waveform associated with the firing of the spark plugs and in relation to commands from the engine control module.

FIG. 2 illustrates an important feature of the present invention. In FIG. 2, there is a waveform 34 which shows the power provided to one of the spark plugs 14 and 18 by way of the respective transformers 12 and 16. As can be seen, this is a square AC waveform that starts at zero volts and rises to five volts, typically. Arrow 36 illustrates the dwell time during the high voltage portion of the waveform 34. The zero volts goes to five volts along the rising edge 38 of the waveform. The high voltage goes back down to zero volts along the falling edge 40 of the waveform 34. In order to fire one of the spark plugs 14 and 18, the five volts are applied continuously between the rising edge 38 and the falling edge 40. During this dwell time 36, the spark plug will be firing continuously within the cylinder of the internal combustion engine. This continuous firing starts at the rising edge 38 and ends at the falling edge 40. As such, the spark plug is activated during the rising edge 38 and deactivated during the falling edge 40. The area of the dwell time 36 allows a series of short or long pulses, or a series of multi-strikes, or a series of multi-bursts to be applied during this dwell time. By activating at the rising edge and deactivating at the falling edge, the present invention allows an AC ignition system to be deployed instantaneously without the need for excessive delay due to the dwell/charging times required by standard DC ignition systems use today.

The waveform 42 shows the pulse from the engine control module 22. This pulse has a logic low 44 and a logic high 46. When the pulse goes from logic low 44 to logic high 46, this will correspond to the rising edge 38 of the waveform 34. The time that the signal is at logic high 46 will correspond to the dwell time 36 of the waveform 34. The change from logic high 46 to logic low 44 will correspond with the falling edge of the waveform 34. In this manner, the engine control module 22 will command the proper performance of the respective transformer or ignition coil.

Within the system of the present invention, the twelve volts input is nominally the voltage of the battery 30. This can vary from six volts at cold cranking to 14.5 or 15 volts during normal operation. The output voltage and energy of the high-voltage transformer is proportional to the input voltage. As such, it is necessary to provide enough voltage and energy input to start the vehicle during low voltage conditions, such as cold starting.

Figure 3:
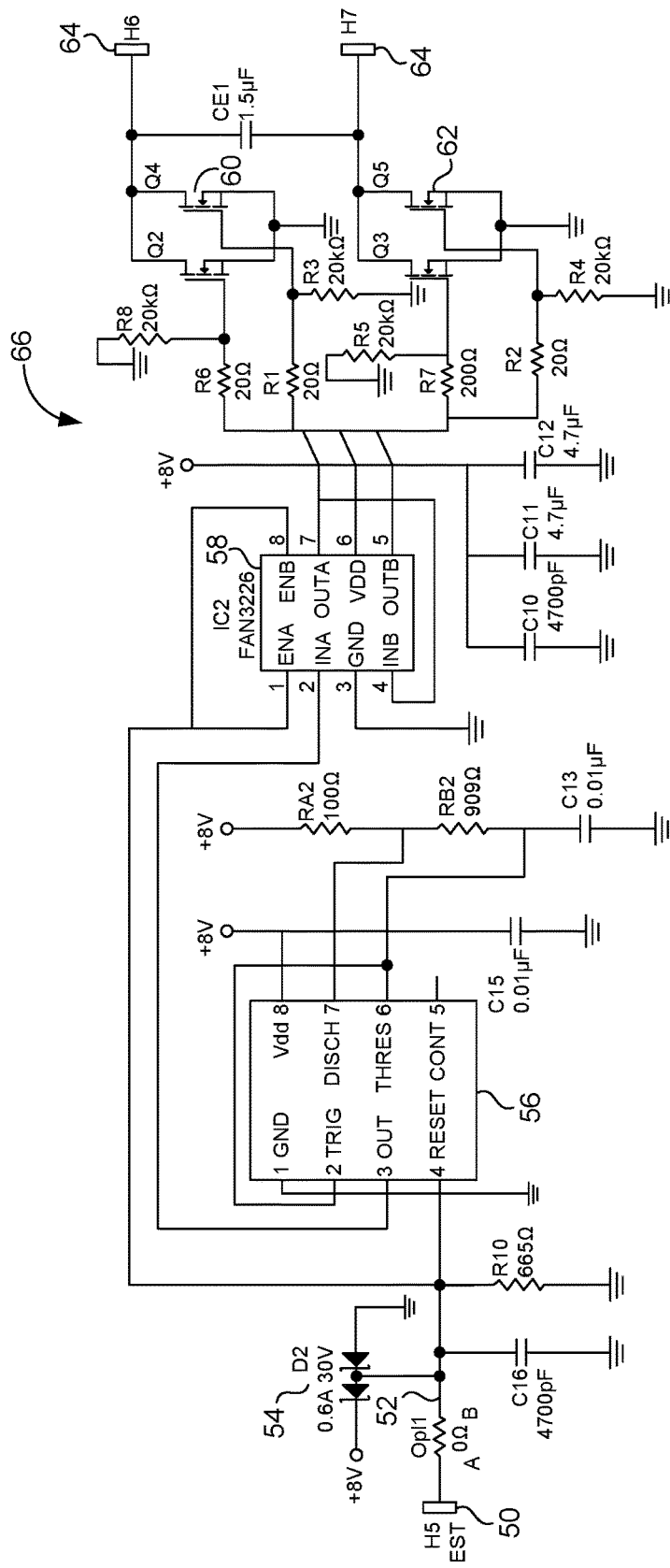
FIG. 3 is an electronic schematic of the driver of the electronic spark control system of the present invention.

FIG. 3 shows a schematic for the driver associated with the electronic spark timing system of the present invention. Initially, the electronic spark timing pulse is received at terminal 50. The spark timing pulse is transmitted along line 52. A transient voltage suppression device is used to clamp transients on the electronic spark timing pulse. A blocking diode combination 54 is provided so as to block current from returning back along line 52 to the electronic spark timing pulse. Ultimately, line 52 will extend to a boost oscillator timing IC 56 and IC 58. The boost oscillator timer IC 56 will provide for the isolation of the signal and the timing of the signal. For example, if it is desired to set the high logic of the waveform 52 for 100 milliseconds, then the boost oscillator timer IC can be set for such a period of time. As such, this will create the necessary timing for the electronic spark timing pulse. The boost oscillator timer IC will ultimately create the waveform 42 which, in turn, will provide the necessary signal for the firing of the spark plugs in the manner shown by waveform 34. The boost oscillator timer IC 56 is connected to the gate driver 58. Gate driver 58 is configured so as to alternately fire the field effect transistors 60 and 62. When the field effect transistors 60 and 62 are fired, then the timing pulse can be transmitted to the spark plug 64. Ultimately, it is important that the gate timer 58 provide a fifty percent on/off duty cycle for each of the field effect transistors 60 and 62. As such, the field effect transistors 60 and 62 will never be on at the same time. The field effect transistors 60 and 62 need to go on-and-off so as to avoid magnetic balancing issues on core saturation. This arrangement keeps the circuit simple, but effective. Importantly, as will be described hereinafter, the power for the firing of the spark plugs is transmitted by the driver circuit 66 by introducing the power to the field effect transistors 60 and 62.

Figure 4:
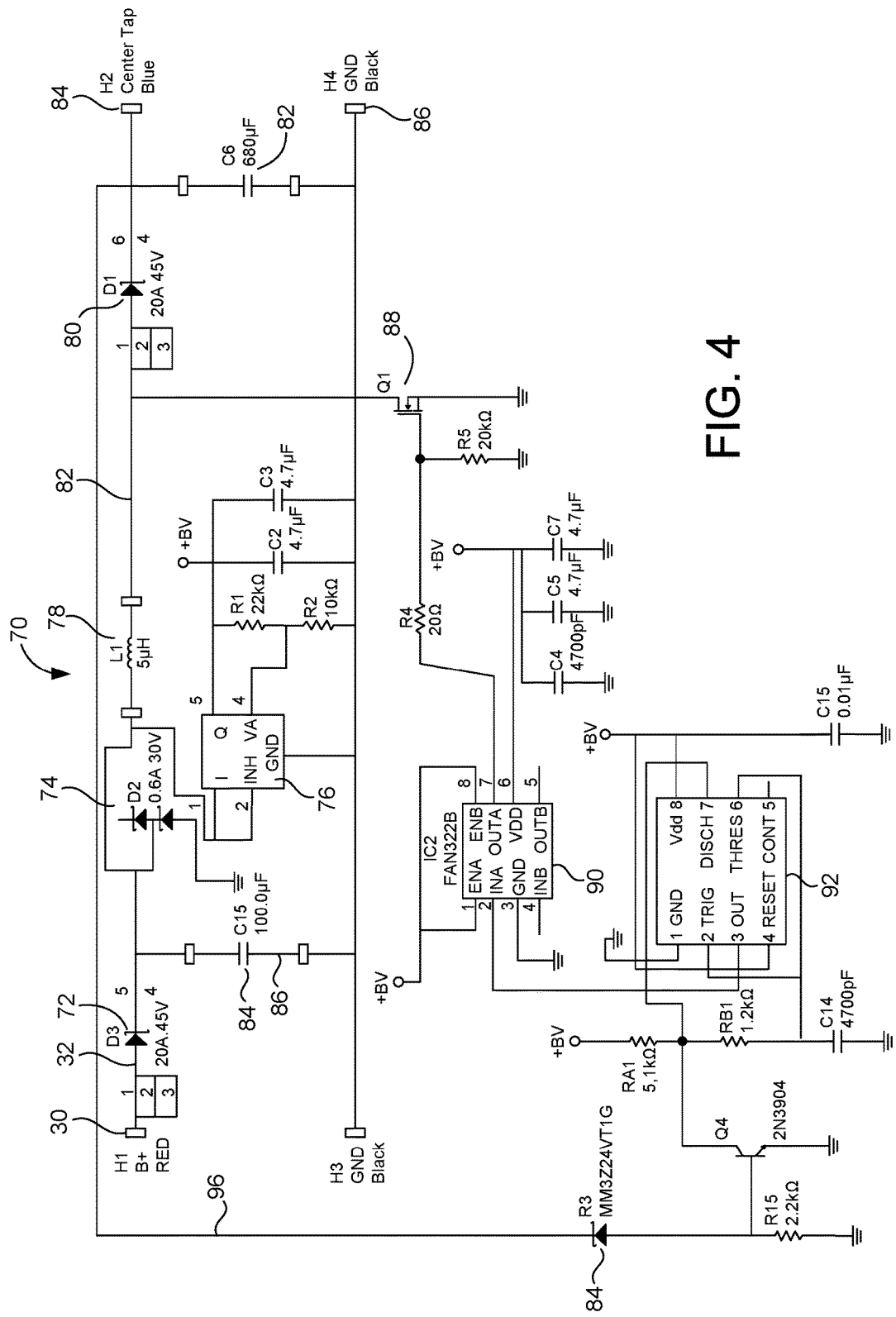
FIG. 4 is electronic schematic of the boost circuit as used in the electronic spark timing control system of the present invention.

FIG. 4 shows the booster circuit 70 that optimally stores the power that is provided to the driver circuit 66 so as to fire the respective spark plugs. Additionally, the battery 30 is connected to line 32 of the boost circuit 70. A diode 72 is provided on line 32 so as to prevent return current to the battery 30. The power from the battery 30 goes to a boost regulator 74. A voltage regulator 76 is cooperative with the boost regulator 74 so as to fix the voltage being transmitted to the inductor 78. A diode 80 is provided on line 82 so as to block return flow current flow and to keep the charge on the capacitor 82. An input capacitor 84 is placed on line 86. Similarly, the output capacitor 84 serves to hold the charge from the battery 30. Ultimately, the output capacitor can be charged to 28 volts. As a result, regardless of the firing of the respective spark plugs 14 and 18 by the electronic spark timing circuit of the present invention, the capacitor 82 will continue to be charged up during the process. As such, if the battery is low, then the capacitor will continue to be charged. The lack of charge on the battery 30 will not change the waveform 34 in any way. All of the power for the firing of the spark plugs is a result of the charging of the capacitor 82. Fundamentally, if the engine speed is high, then the battery 30 will be charged fully. This will meet the requirements for producing the waveform 34. If the battery is low and the car is idling, the charge in the battery will be low. However, the power required for the firing the spark plugs as a virtue of the waveform 34 will be less. Since the capacitor 82 is continuously charged by the boost circuit 70 of the present invention, the present invention avoids the need for any charging time for the ignition coils or transformers. The power is continuously available.

Ultimately, the output 84 of the boost circuit 70 will be connected to the center tap of the field effect transistors 60 and 62 in the driver circuit 66 shown in FIG. 3. Output 86 is connected to ground.

Field effect transistor 88 controls the charge inductor and timer control. Field effect transistor 88 operates in combination with the gate driver IC 90 and with the boost oscillator IC 92. Boost oscillator IC sets the frequency of the signal passing as the output 84. This would typically be 50,000 Hz. However, the boost oscillator could be set so as to change the firing pattern during the dwell time 36 of the waveform 34. It can be used so as to create a multi-strike waveform or a multi-burst waveform. A Zener diode 94 is located on feedback loop 96 so as to set the target voltage for the circuit 70.

In the present invention, by virtue of the driver circuit 66 and the boost circuit 70, the present invention provides the necessary timing so as to produce the waveform 42. It also provides the necessary power, in relation to the timing waveform 42, so as to present the waveform 34 for the firing of the spark plugs.

The present invention provides an AC ignition control system which allows for simple and direct control of the spark duration by use of the electronic spark timing signal directly and/or proportionately. The AC ignition control method provides a means for a series of short duration spark events which are timed from the rising edge to the falling edge of the electronic spark timing command pulse. The present invention further provides an AC control method which provides a means for a series of short duration spark events by direct control of the electronic spark timing pulse itself. The AC ignition system control method can be deployed via a serial data interface bus, or similar strategy, which allows a similar precise digital control of the spark arc duration.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. A method of firing a spark plug of an internal combustion engine, the method comprising:
   connecting an engine control module to an ignition coil;
   connecting the engine coil to the spark plug;
   connecting a battery to said engine control module, said battery having at least eight volts;
   supplying AC power to the spark plug, the AC power having a waveform with a rising edge and a falling edge;
   activating the spark plug during the rising edge of the waveform;
   deactivating the spark plug during the falling edge of the waveform; and
   storing power from said battery during the steps of activating and deactivating.

2. The spark ignition system of claim 1, further comprising:

transmitting the AC power to said ignition coil, said ignition coil firing between said rising edge and said falling edge of the waveform.

3. The method of claim 2, the firing of said ignition coil mirroring the waveform of AC power from said engine control module.

4. The method of claim 1, further comprising:
converting DC power from said battery into the AC waveform.

5. The method of claim 1, said waveform being a square wave between zero and five volts.

6. The method of claim 1, the step of activating being between 5 microseconds and 10 milliseconds following the step of activating.

7. The method of claim 1, the step of activating comprising:
continuously firing the spark plug during a period between the rising edge and the falling edge of the waveform.

* * * * *